US009049265B1

(12) United States Patent
Greenfield et al.

(10) Patent No.: US 9,049,265 B1
(45) Date of Patent: Jun. 2, 2015

(54) SERVING REMOTE ACCESS TO STORAGE RESOURCES

(71) Applicant: Google Inc., Mountain View, CA (US)

(72) Inventors: Lawrence Elias Greenfield, New York, NY (US); Michael Roger Marty, Madison, WI (US)

(73) Assignee: Google Inc.

( * ) Notice: Subject to any disclaimer, the term of this patent is extended or adjusted under 35 U.S.C. 154(b) by 226 days.

(21) Appl. No.: 13/726,856

(22) Filed: Dec. 26, 2012

(51) Int. Cl.
*G06F 15/173* (2006.01)
*G06F 15/16* (2006.01)
*H04L 29/06* (2006.01)

(52) U.S. Cl.
CPC ...................................... *H04L 67/42* (2013.01)

(58) Field of Classification Search
USPC .................................................. 709/203–231
See application file for complete search history.

(56) References Cited

U.S. PATENT DOCUMENTS

| | | | |
|---|---|---|---|
| 5,857,190 A | 1/1999 | Brown | |
| 6,026,414 A | 2/2000 | Anglin | |
| 6,219,693 B1 | 4/2001 | Napolitano et al. | |
| 6,260,069 B1 | 7/2001 | Anglin | |
| 6,301,605 B1 | 10/2001 | Napolitano et al. | |
| 6,970,928 B2 * | 11/2005 | Ihara et al. | 709/226 |
| 7,725,535 B2 | 5/2010 | Koonce et al. | |
| 7,934,055 B2 | 4/2011 | Flynn et al. | |
| 8,019,940 B2 | 9/2011 | Flynn et al. | |
| 8,275,894 B2 * | 9/2012 | Oh et al. | 709/228 |
| 8,407,377 B1 * | 3/2013 | Shapiro et al. | 710/23 |
| 2003/0149750 A1 | 8/2003 | Franzenburg | |
| 2008/0140932 A1 | 6/2008 | Flynn et al. | |
| 2008/0235746 A1 | 9/2008 | Peters et al. | |
| 2008/0256183 A1 | 10/2008 | Flynn et al. | |
| 2008/0256292 A1 | 10/2008 | Flynn et al. | |
| 2009/0077234 A1 * | 3/2009 | Sano | 709/225 |
| 2009/0100163 A1 | 4/2009 | Tsao et al. | |
| 2011/0047210 A1 * | 2/2011 | Paila et al. | 709/203 |
| 2011/0093740 A1 | 4/2011 | Tsao et al. | |
| 2011/0179225 A1 | 7/2011 | Flynn et al. | |
| 2011/0296277 A1 | 12/2011 | Flynn et al. | |
| 2012/0243520 A1 * | 9/2012 | Lee et al. | 370/338 |
| 2013/0254435 A1 * | 9/2013 | Shapiro et al. | 710/23 |

* cited by examiner

Primary Examiner — Jude Jean Gilles (57) ABSTRACT

A method of processing client requests that includes receiving a client request from a client for access to data, issuing a direct memory access command to non-transitory storage resources to load data to a target memory location without accessing the target memory location, and instructing a network interface controller in communication with the storage resources to send a response to the client. The response includes an information portion and a data portion.

22 Claims, 6 Drawing Sheets

000
SERVING REMOTE ACCESS TO STORAGE RESOURCES

TECHNICAL FIELD

This disclosure relates to processing client requests in distributed storage systems.

BACKGROUND

A distributed system generally includes many loosely coupled computers, each of which typically include a computing resource (e.g., (processor(s)) and storage resources (e.g., memory, flash memory, and/or disks). A distributed storage system overlays a storage abstraction (e.g., key/value store or file system) on the storage resources of a distributed system. In the distributed storage system, a server process running on one computer can export that computer's storage resources to client processes running on other computers. Remote procedure calls (RPC) may transfer data from server processes to client processes.

A remote procedure call is a two-sided software operation initiated by client software executing on a first machine and serviced by server software executing on a second machine. Servicing storage system requests (e.g., read data) in software may require an available processor, which may place a significant limitation on a distributed storage system. In the case of a distributed storage system, this means a client process cannot access a remote computer's storage resources unless the remote computer has an available processor to service the client's request. Moreover, the demand for processor resources and storage resources in a distributed system often do not match. In particular, computing resources (i.e., processors) may have heavy and/or unpredictable usage patterns, while storage resources may have light and very predictable usage patterns. When a server's processor(s) are heavily utilized, there may be no processors available to service a storage request when it arrives. In this case, the storage request waits for completion of other software tasks executed by the processor(s) or preemption by a kernel before the storage request can be serviced by a processor, even though there may be plenty of storage bandwidth to service the request immediately. Alternatively, one or more dedicated processors could service such storage requests, at the expense of efficiency and decreased processing capacity for nominal processing tasks.

Generally, coupling processor and storage resources can result in high and/or unpredictable latency, especially if the distributed system's processor resources are heavily utilized. Moreover, the processor cost for accessing a storage resource remotely generally incurs additional overheads for moving data from storage buffer memory to network buffer memory.

SUMMARY

The present disclosure provides solutions for reducing or eliminating a processor cost associated with servicing storage access requests. In some implementations, methods of processing client requests including eliminating a transfer of data from a kernel space of virtual memory to a user space of virtual memory and then back to the kernel space. The implementations may also include specifying an intermediate memory location for IO devices (e.g., a storage controller and a network interface controller (NIC), such that a client server process maintains management of a buffer memory, and leveraging both storage controller and NIC direct memory access (DMA) engines to eliminate all CPU loads of the data. This allows an application in the user space to control a buffer pool and eliminates the aforementioned copying of data.

One aspect of the disclosure provides a method of processing client requests that includes receiving a client request from a client for access to data, issuing a direct memory access command to a storage controller of non-transitory storage resources to load data to a target memory location without accessing the target memory location, and instructing a network interface controller in communication with the storage resources to send a response to the client. The response includes an information portion and a data portion.

Implementations of the disclosure may include one or more of the following features. In some implementations, the method includes sending a vector of at least two data buffers to the network interface controller. One of the data buffers includes the target memory location. The method includes registering a set of direct memory accessible regions of the memory with the storage controller and the network interface controller, where the registered memory regions are pinned from swap operations. In other words, the method may include making virtual memory available for direct memory access by both the storage controller and the network interface controller, for example, via pinning, so that the virtual memory is not swapped out while DMA operations are in progress. The target memory location may be direct memory access accessible. In some examples, the method includes storing an integrity hash value (e.g., check sum) with the data portion of the response. Additionally or alternatively, the method may include storing an integrity hash value (e.g., check sum) with the information portion of the response (e.g., as metadata). The client may compute a hash value of the received data and compare that hash value with the received integrity hash value to determine if the data receipt was successful. The method may include computing a hash of the data and at least a portion of the information portion for the integrity hash value.

Another aspect of the disclosure provides a computer that includes non-transitory memory having a storage controller, a network interface controller in communication with the memory and servicing client requests, and a computing processor in communication with the memory and the network interface controller. The computing processor executes a server process. In response to receiving a client request for access to data, the server process instructs the storage controller to load the data to a target memory location without accessing the target memory location, and instructs the network interface controller to send a response to the client. The response includes an information portion and a data portion.

In some implementations, the server process sends a vector of at least two data buffers to the network interface controller. One of the data buffers includes the target memory location. The server process may register a set of direct memory accessible regions of the memory with the storage controller and the network interface controller, where the registered memory regions are pinned from swap operations. The target memory location may be direct memory access accessible. In some examples, the network interface controller stores an integrity hash value (e.g., checksum) with the data portion of the response. The data portion or the information portion may include an integrity value (e.g., hash), to allow the client to verify the received data. As mentioned earlier, the integrity hash value may be a hash of the data and at least a portion of the information portion.

Another aspect of the disclosure provides another method of processing client requests. The method includes receiving a client request from a client for access to data and instructing a storage controller to transmit the data to a virtual address specified by a user application of a user space of non-transitory memory. The user application instructs a network interface controller to transmit the data from that virtual address without performing any loads or stores to the virtual address. The storage controller and the network interface controller translate the same virtual address to the same physical address of the non-transitory memory.

In some implementations, the storage controller segregates virtual memory into a kernel space that stores a kernel and the user space that stores the user application. The virtual address may reside in the user space. The method may include registering a set of direct memory accessible regions of the memory with the storage controller and the network interface controller, where the registered memory regions are pinned from swap operations. The physical address that receives the data may be direct memory access accessible. In some examples, the method includes storing an integrity hash value (e.g., checksum) with the data. Additionally or alternatively, the method may include storing an integrity hash value with the information portion of the response (e.g., as metadata). The method may include computing a hash of the data and at least a portion of the information portion as the integrity hash value. The client may compute a hash value of the received data and compare that hash value with the received integrity hash value to determine if the data receipt was successful.

In yet another aspect, a computer includes non-transitory memory having a storage controller that segregates virtual memory into a kernel space that stores a kernel and a user space that stores a user application. The computer also includes a network interface controller in communication with the memory and servicing client requests. A computing processor, in communication with the memory and the network interface controller, executes a server process. In response to receiving a client request for access to data, the server process instructs the storage controller to transmit the data to a virtual address in the user space specified by the user application. The user application instructs the network interface controller to transmit the data from that virtual address without performing any loads or stores to the virtual address. The storage controller and the network interface controller can translate the same virtual address to the same physical address. In other words, the storage controller and the network interface controller can both map a particular virtual address to its corresponding physical address, and optionally vice-versa. So, if the storage controller receives a certain virtual address and the network interface controller receives that same virtual address, they can both access the corresponding physical address in memory.

In some implementations, the storage controller receives a virtual address and translates that address to a physical address. The server process may register a set of direct memory accessible regions of the memory with the storage controller and the network interface controller, where the registered memory regions are pinned from swap operations. Moreover, the target memory location may be direct memory access accessible. In some examples, the network interface controller stores an integrity hash value (e.g., checksum) with the data.

The network interface controller may send a vector of at least two data buffers to the network interface controller. One of the data buffers includes the virtual address. In some examples, the network interface controller sends a response to the client that has an information portion and a data portion. Either the data portion or the information portion of the response may include an integrity hash value for client verification of the data. Moreover, the network interface controller may compute a hash of the data and at least a portion of the information portion as the integrity hash value.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
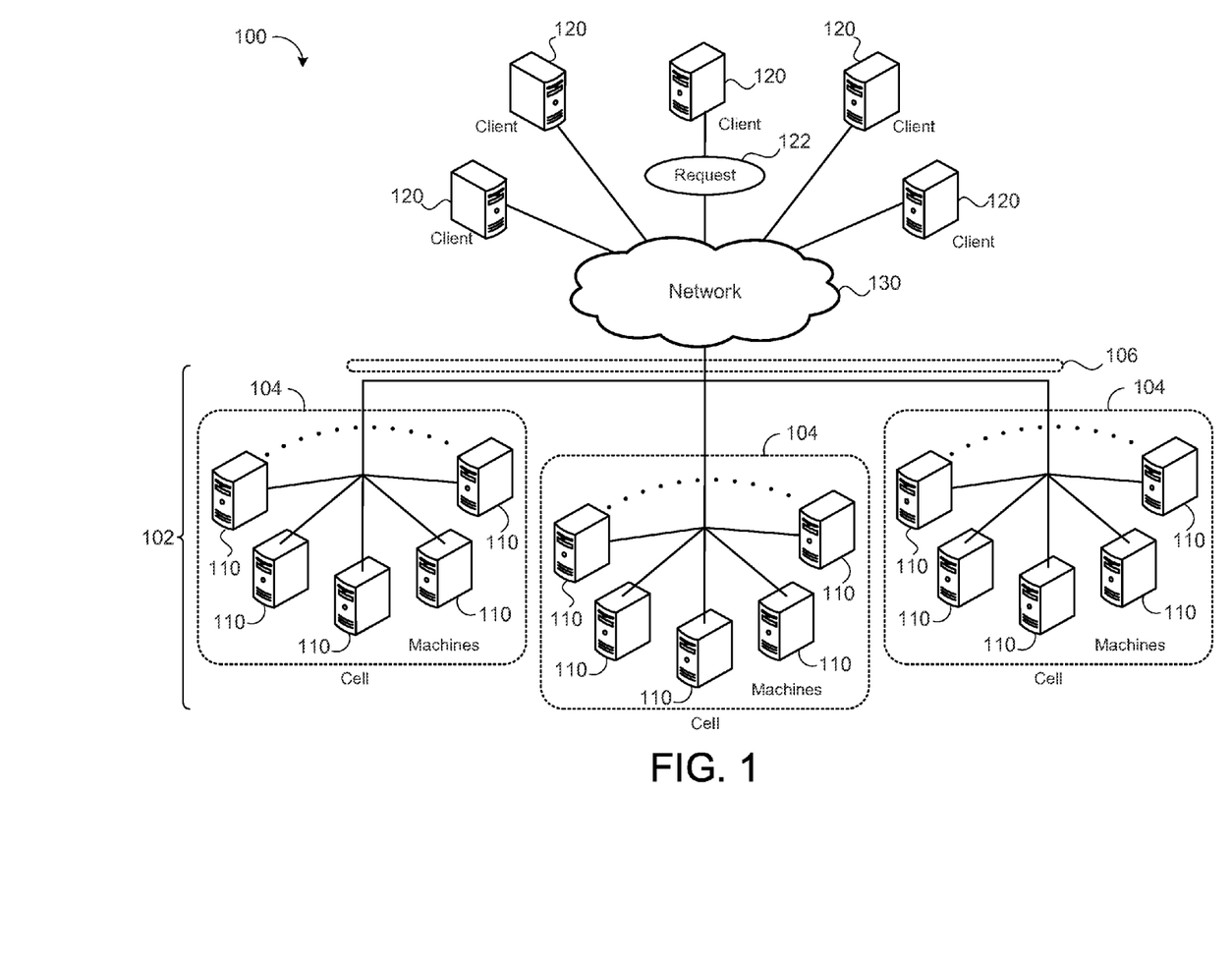
FIG. 1 is a schematic view of an exemplary distributed storage system.
Figure 2:
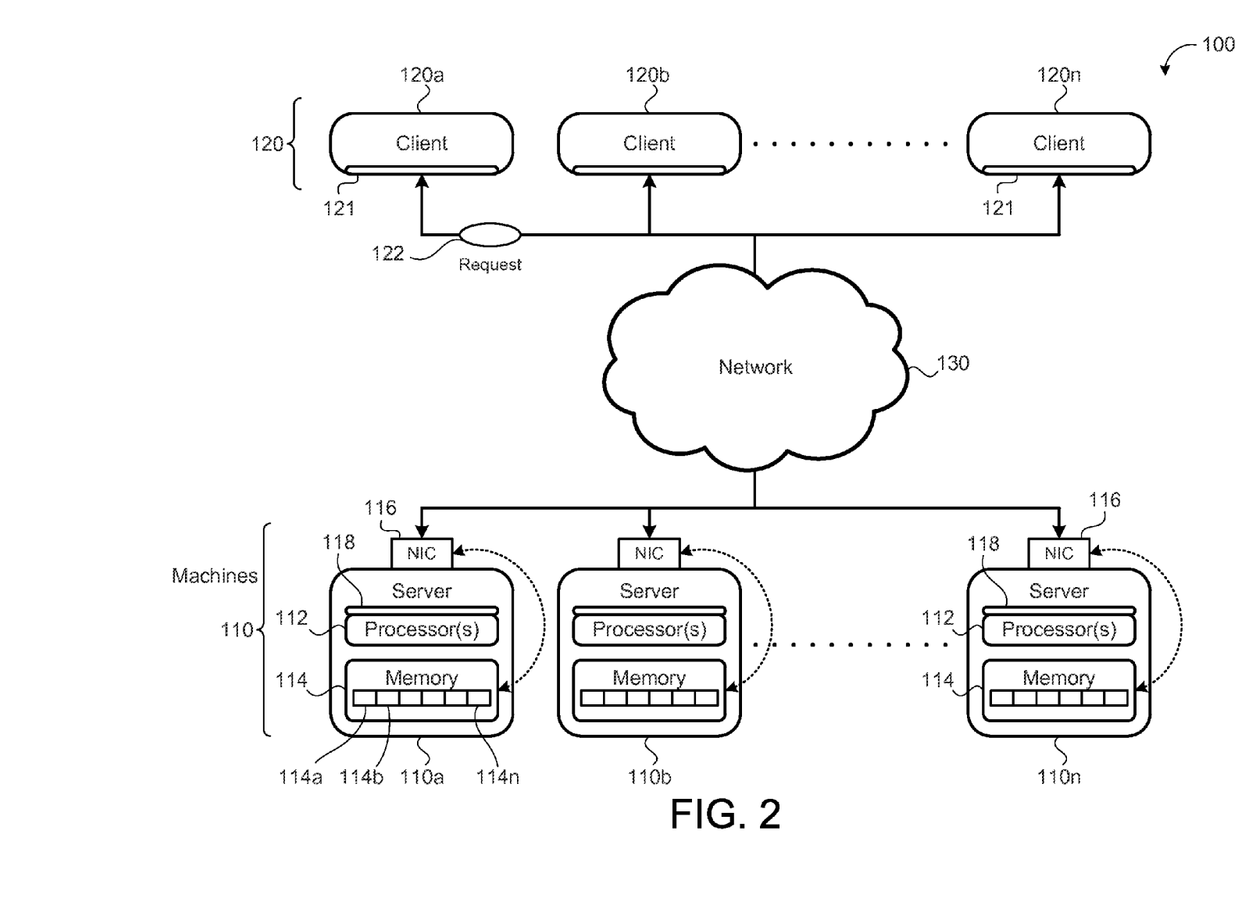
FIG. 2 is a schematic view of an exemplary distributed storage system.

Referring to FIGS. 1 and 2, in some implementations, a distributed system 100 includes a duster 102 of loosely coupled machines 110, 110*a-n* (e.g., memory hosts, computing processors, computers or servers, etc.), which may be grouped in cells 104. Each machine 110 has a computing resource 112 (e.g., one or more processors) in communication with storage resources 114 (e.g., non-transitory memory, flash memory, dynamic random access Memory (DRAM), phase change memory (PCM), and/or disks). The distributed system 100 may include a storage abstraction layer 106 (e.g., key/value store or file system) overlain on the storage resources 114, which allows scalable use of the storage resources 114 by one or more clients 120, 120*a-n*. Clients 120 may communicate with the machines 110 through a network 130. In some implementations, the clients 120 send requests 122 to the machines 110 for execution.

In some implementations, the distributed system 100 is a distributed storage system, and the machines 110 are storage servers. The storage resources 114 may store an operating system 140 that executes on the computing resource 112 and segregates virtual memory 150 into kernel space 160 and user space 170. The kernel space 160 is reserved for finning a kernel 162 of the operating system 140, kernel extensions, and optionally device drivers. The user space 170 is the memory area where all user mode applications 172 work and this memory can be swapped out when necessary. The kernel 162 may be a bridge between the application(s) 172 and the actual data processing done at the hardware level on the processor 112. Moreover, the kernel's responsibilities may include managing the system resources (e.g., the communication between hardware and software components). As a basic component of the operating system 140, the kernel 162 can provide the lowest-level abstraction layer for resources (e.g., the processor(s) 112 and I/O devices) that application software must control to perform its function. The kernel 162 may make these facilities available to application processes through inter-process communications and system calls.

The storage server 110 may receive a request 122 from a client 120, recognize the type of request 122, initiate a memory read (e.g., a disk read of the device) and return data 10 for execution of the request 122 to the kernel storage space 160 of the storage resources 114. In some implementations, to read the data 10, the storage server 110 copies the data 10 from the kernel storage space 160 to the user space 170. To transmit the data 10 over the network 130, the storage server then copies the data 10 from the user storage space 170 to the kernel storage space 160 again, so that the kernel 162 can transmit the data 10 over the network 130. This type of implementation requires two data copies. To avoid the data copies, the storage server 110 may employ direct memory access (DMA), which avoids using the computing resource 112 (i.e., the processor) to access the data 10.

Figure 3:
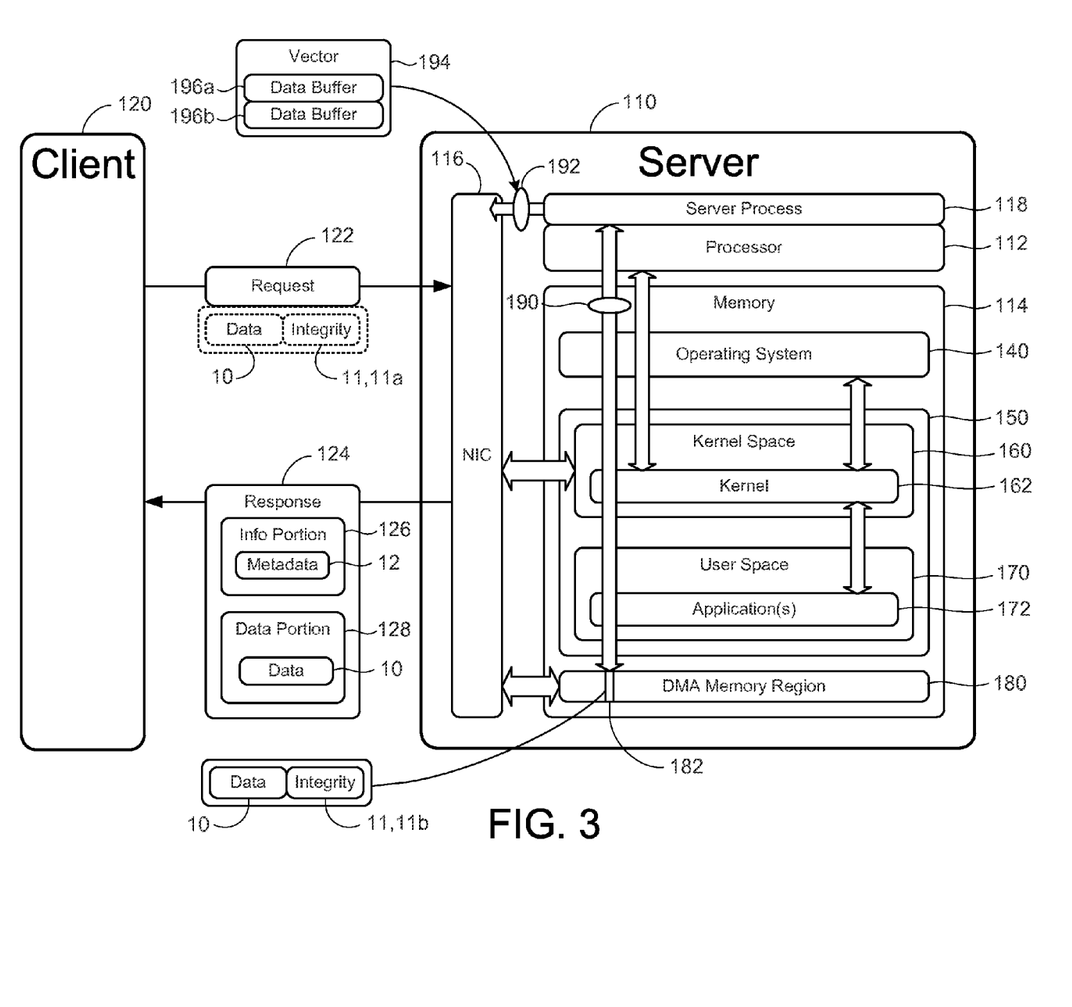
FIG. 3 is a schematic view of an exemplary server receiving a client request from a client.

Referring to FIG. 3, in some implementations, the storage resources 114 includes a memory region 180, referred to herein as a DMA memory region, accessible by both a network IO device (e.g., the NIC 116) and a storage 10 device (e.g., the storage resources 114). The storage server 110 may register the direct memory accessible memory region(s) 180 (e.g., with the storage resources 114 and the network interface controller 116), via pinning, so that the memory (e.g., virtual memory) is not swapped out while DMA operations are in progress. When the storage server 110 receives a client request 122, from the user space 170, the storage server 110 may initiate a direct memory access (DMA) transfer in the storage resources 114 (e.g., on a flash device). The storage server 110 may direct the storage resources 114 to read data from itself and write the data to a provided buffer 180, such a DMA memory region 180. The buffer 180 is made available to a network interface controller (NIC) 116 of the storage server 110, which transmits the buffered data 10 over the network 130.

In some implementations, upon receiving a client request 122 for access to data, the server process 118 issues a DMA command 190 to the storage resources 114 to load the data 10 to a memory location 182 in the DMA memory region 180. Upon completion, the server process 118 issues a command 192 to the network interface controller (NIC) 116, instructing the NIC 116 to send a response 124 to the client 120. The response 124 includes an information portion 126 storing information 12 (e.g., metadata) and a data portion 128 for the actual data 10. The command 192 to the NIC 116 may be a vector 194 of at least two data buffers 196a, 196b, where one of the data buffers 196a, 196b is memory location 182. At no point does the server process 118 actually perform instructions to read the contents of memory location 182.

A network interface controller 116 (also known as a network interface card, network adapter, or LAN adapter) may be a computer hardware component that connects a computing resource 112 to the network 130. The network controller 116 implements communication circuitry using a specific physical layer (OSI layer 1) and data link layer (layer 2) standard, such as Ethernet, Wi-Fi, or Token Ring. This provides a base for a full network protocol stack, allowing communication among small groups of computers on the same LAN and large-scale network communications through routable protocols, such as Internet Protocol (IP). Both the machines 110a-n and the client 120 may each have a network interface controller 116 for network communications. A machine process 118 executing on the computing processor 112 of the machine 110 may register a set of direct memory accessible regions 114a-n of the memory 114 with the storage controller 115 and the network interface controller 116. The machine process 118 may register the direct memory accessible regions 114a-n of the memory 114 with a permission of read-only or read/write.

In some implementations, the network 130 is an InfiniBand network, which is a switched fabric communications link generally used in high-performance computing and enterprise data centers. It features high throughput, low latency, quality of service, failover, and scalability. The InfiniBand architecture specification defines a connection between processor nodes and high performance I/O nodes such as storage devices. The InfiniBand network 130 conveys direct memory access (DMA) requests 122 from a client 120 to a machine 110 (storage server). At the machine 110, an DMA-capable InfiniBand network interface controller (NIC) 116 performs reads and writes of the storage resource 114 (e.g., DRAM). DMA uses zero-copy, OS-bypass to provide high throughput, low latency access to data (e.g. 4 GB/s of bandwidth and 5 microsecond latency). The distributed storage system 100 may use DMA, remote procedure calls, or other data access methods to access data.

In some implementations, rather than having the processor 112 of the storage server 110 execute a server process 118 that exports access of the corresponding storage resource 114 (e.g., non-transitory memory) to client processes 121 executing on the clients 120, the clients 120 may directly access the storage resource 114 for read transactions through a network interface controller (NW) 116 of the storage server 110. In other words, a client process 121 executing on a client 120 may directly interface with one or more storage resources 114 without requiring execution of a routine of any server processes 118 executing on the computing resources 112. This offers relatively high-throughput and low latency, since clients 120 can access the storage resources 114 without interfacing with the computing resources 112 of the machine 110.

Every block of data 10 stored on the storage resources 114 may include an associated integrity value 11, such as hash value or checksum. Rather than checking the integrity of the read data 10 before transmitting the data 10 over the network 130 (e.g., where the CPU checks every byte of data), the storage server 110 computes an integrity value 11 (hash or checksum) for association with the data 10, so that the client 120 may check the integrity of the data 10. The storage server 110 (e.g., via the network interface controller 116) may store the integrity value 11 in the metadata 12 of the information portion 128 of the response 124. Additionally or alternatively, the network interface controller 116 may store the integrity value 11 in the data portion 128. The client 120 may therefore perform an integrity check of the data 10 without any computation services of the server 110. The hardware of the server 110 may offload the computation of the hash value (or checksum) in the storage resources 114 itself. If the client 120 detects an invalid integrity hash, it may notify the storage server 110, so that the storage server 110 can check for corruption.

In some implementations, in response to receiving a write memory access request 122, the server 110 may write or modify data 10 stored in the storage resource 114. After the write operation, the server 110 may compute an integrity value 11 (e.g., a hash or a checksum) of the modified data 10 and associate the integrity value 11 with the modified data 10. In some examples, the server 110 stores the integrity value 11 in the metadata 12 associated with the data 10. The server 110 may execute a hash function, such as a cryptographic hash function, to compute the checksum. Moreover, the hash function may be configured for randomization. Each checksum may be a word having at least 32 bits that are non-cryptographic (CRC32C). A network interface controller 116 servicing the requests 122 may determine the checksum for association with the affected data 10.

In some implementations, when the client 120 executes a write request 122 to write data 10 to the server 110, the client 120 computes a first integrity value 11a (e.g., hash) of the data 10 and sends the first integrity value 11a to the server 110 with the data 10. The server 110 proceeds to write the data 10 to its storage resources 114 without use of the computational resources 112 (e.g., via direct memory access through the network interface controller 116) and computes a second integrity value 11b. If the first and second integrity values 11a, 11b do not match, the server 110 may raise an error. The server 110 may store the second integrity value 11b in the metadata 12 associated with the data 10.

In some implementations, when the client 120 executes a read request 122 to read data 10 from the server 110, the server 110 reads and sends the requested data 10 and its associated integrity value 11, 11b to the client 120 in a response 124. The server 110 may return the requested data 10 and integrity value 11, 11b without using its computational resources (e.g., via direct memory access by the client 120). As mentioned earlier, the integrity value 11, 11b may be stored in the metadata 12 or with the data 10 itself in the response 124. After receiving the response 124, the client 120 may re-compute the integrity value 11, 11a of the data 10 and, if the first and second integrity values 11a, 11b fail to match, send an error message back to the server 110. The server 110 may perform an integrity check to determine whether the error was a transitory network issue or a permanent storage failure.

The integrity value 11 may be based on a portion of the metadata 12 associated with the corresponding data 10. For example, the integrity value 11 may be a hash value that includes an offset of the data 10 relative to a start of the device, or higher level metadata, such as the name of a file, a unique identifier for a file, an offset within the file, a user writing the file, etc. This additional information needed for computing the integrity value 11 may be provided by the storage resources 114 and/or the network interface controller 116.

A network security mechanism may prevent spoofing of internet protocol (IP) connections by allowing the server 110 to transmit data 10 to the client 120 without computing a connection-specific integrity hash. In some implementations, a network switch of the network 130 verifies that both the server 110 and the client 120 are sending data packets with the expected source IP address.

Figure 4:
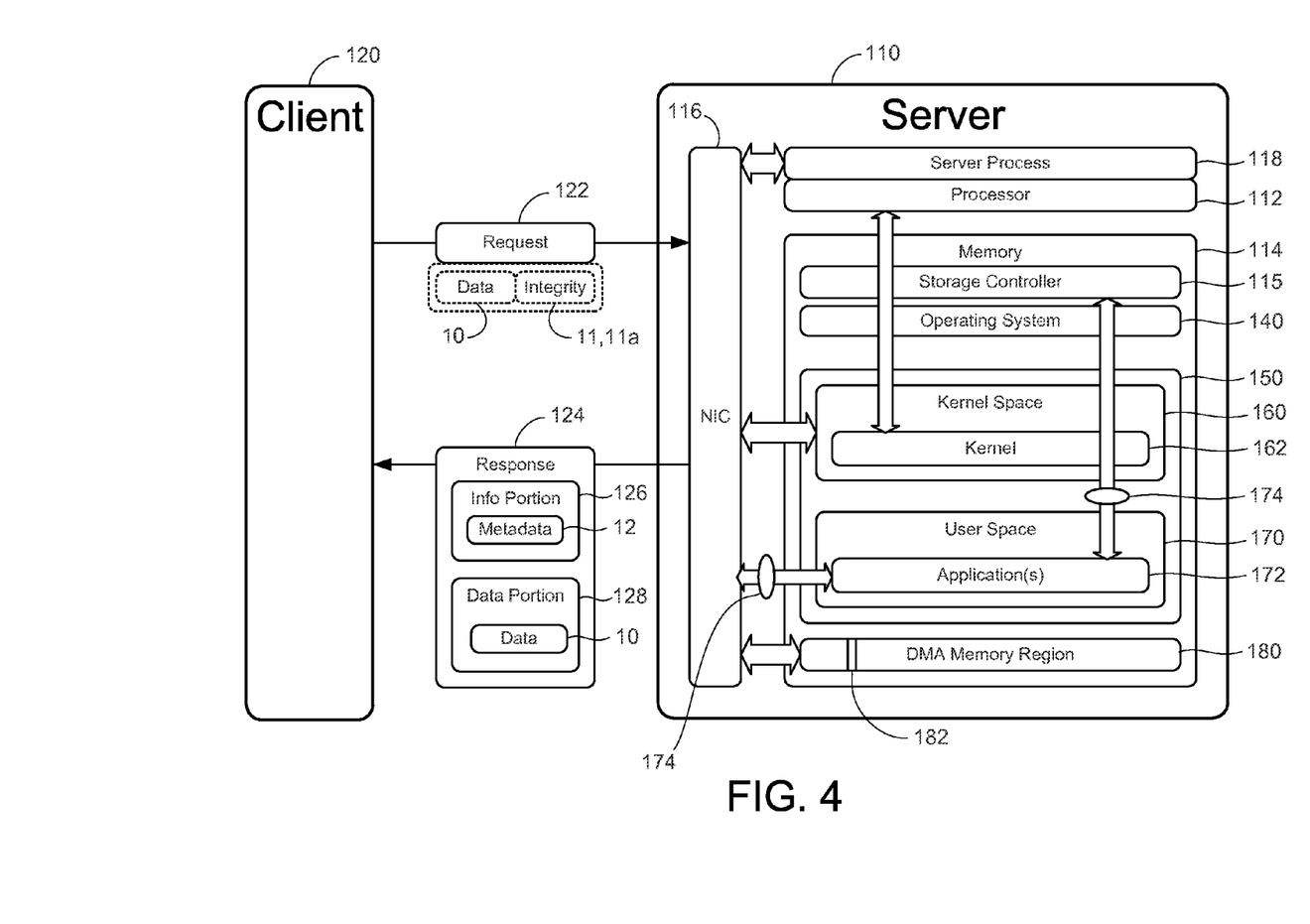
FIG. 4 is a schematic view of an exemplary server having a storage controller and a network interface controller that can translates the same virtual address to the same physical address of non-transitory memory.

Referring to FIG. 4, in some implementations, a user space application 172 provides a storage controller 115 (e.g., a flash controller) with a virtual address of where the storage resources 114 should transfer data 10 via DMA. The storage resources 114 may be a flash memory device and the storage controller 115 may be a flash controller. In this case, the entire service to operates entirely in the user space 170. Both the storage resources 114 and the network interface controller 116 provide user-level access to their respective command queues by mapping device memory registers to the virtual address space of the user-level application program 172. By bypassing the kernel 162 (OS Bypass) for both storage device and network device access, efficiency gains can be obtained not otherwise possible when OS bypass is available in only one of the devices (i.e., one of the storage resources 114 and the network interface controller 116). Both the storage controller 115 and the network interface controller 116 can translate (e.g., map) the same virtual address 174 (e.g., pointer) to the same physical address 182, such as that of a buffer 180. Moreover, the storage controller 115 and the network interface controller 116 can receive the same virtual address 174 (pointer) from the user space application 172.

In implementations where virtual memory is divided into fixed sized pages and allocated in fixed sized physical memory frames. The pages do not have to be contiguous in memory. A page table may keep track of where each page is located in physical memory. This allows the operating system to load a program of any size into any available frames. Moreover, only the currently used pages need to be loaded. Unused pages can remain on disk until they are referenced. This allows many large programs to be executed on a relatively small memory system. A virtual memory address may be composed of two parts: a page number and an offset into the page. The page number determines which page contains the information and the offset specifies which byte within the page. The size of the offset field may be the log base 2 of the size of a page. To convert a virtual address into a physical address, the CPU may use the page number as an index into the page table. If the page is resident, the physical frame address in the page table is concatenated in front of the offset to create the physical address.

Both storage resources 114 and the network interface controller 116 may implement memory translation services to translate application-provided virtual memory addresses 174 to physical memory addresses 182. The system therefore enables both the storage 10 device and the network 10 device to access a shared memory region 180, 182 with application-provided virtual addresses 174. This allows the storage server 110 to direct the storage resources 114 to transmit the data 10 to a virtual address 174 specified by the user application 172, which can then instruct the network 10 device (e.g., NIC 116) to transmit data 10 from that virtual address 174 without performing any loads or stores to the virtual addresses 174. The storage controller 115 receives a virtual address 174 and translates that address to a physical address 182. For flash memory, a flash controller may only use physical addresses 182, which makes it difficult to interact with a user space 170, which uses virtual addresses 174.

Figure 5:
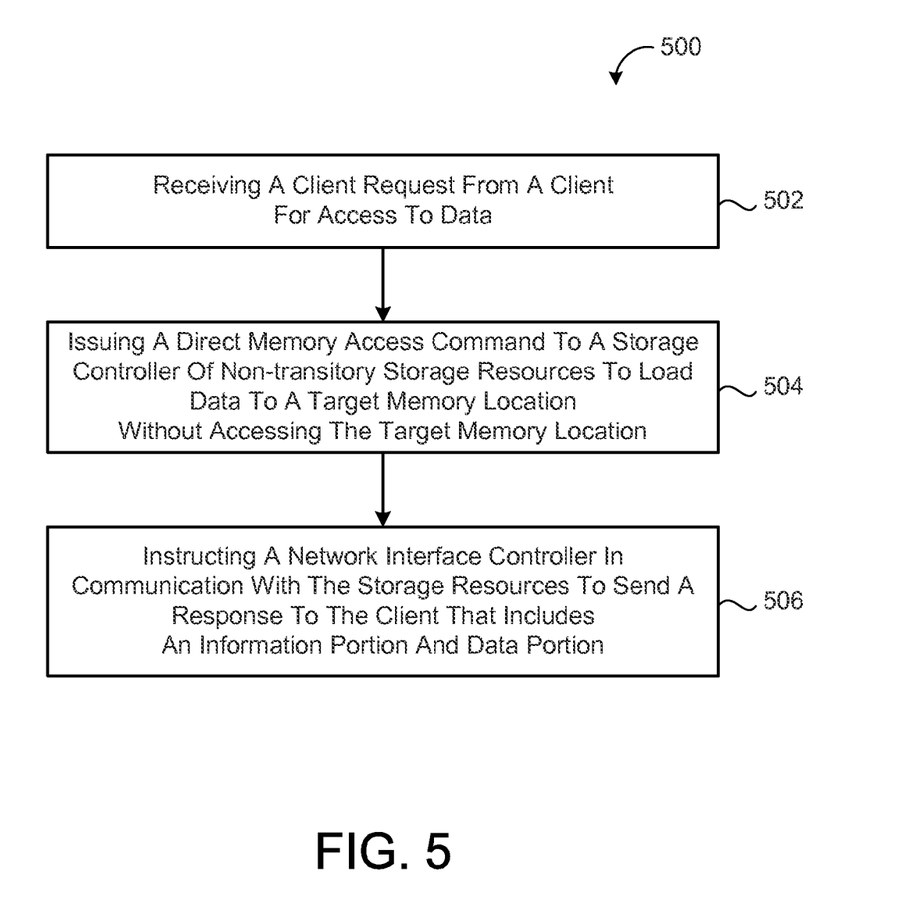
FIGS. 5 and 6 are exemplary arrangements of operations for methods of processing client requests.

FIG. 5 provides an exemplary arrangement 500 of operations for a method of processing client requests 122. The method includes receiving 502 a client request 122 from a client 120 for access to data 10, issuing 504 a direct memory access command 190 to non-transitory storage resources 114 to load the data 10 to a target memory location 182 without accessing the target memory location 182, and instructing 506 a network interface controller 116 in communication with the storage resources 114 to send a response 124 to the client 120. The response 124 includes an information portion 126 and a data portion 128. In some implementations, the method includes sending a vector 194 of at least two data buffers 196a, 196b to the network interface controller 116. One of the data buffers 196a, 196b includes the target memory location 182. The method may include registering a set of direct memory accessible regions 180 of the memory 114 with the storage controller 115 and the network interface controller 116, such that the memory regions are available for direct memory access by both the storage controller 115 and the network interface controller 116, for example, via pinning, so that the virtual memory is not swapped out while DMA operations are in progress. The target memory location 182 may be direct memory access accessible. In some examples, the method includes, storing an integrity hash value or check sum with the data portion 128 of the response 124.

Pinned memory is never swapped out (e.g., to never swapped to secondary storage). Pinning enables memory pages to be maintained in real memory all the time. Pinning a memory region prohibits a pager from stealing pages from the pages backing the pinned memory region. Memory regions defined in either kernel space 160 or user space 170 may be pinned. After a memory region is pinned, accessing that region does not result in a page fault until the region is subsequently unpinned. While a portion of the kernel remains pinned, many regions are pageable and are only pinned while being accessed.

Figure 6:
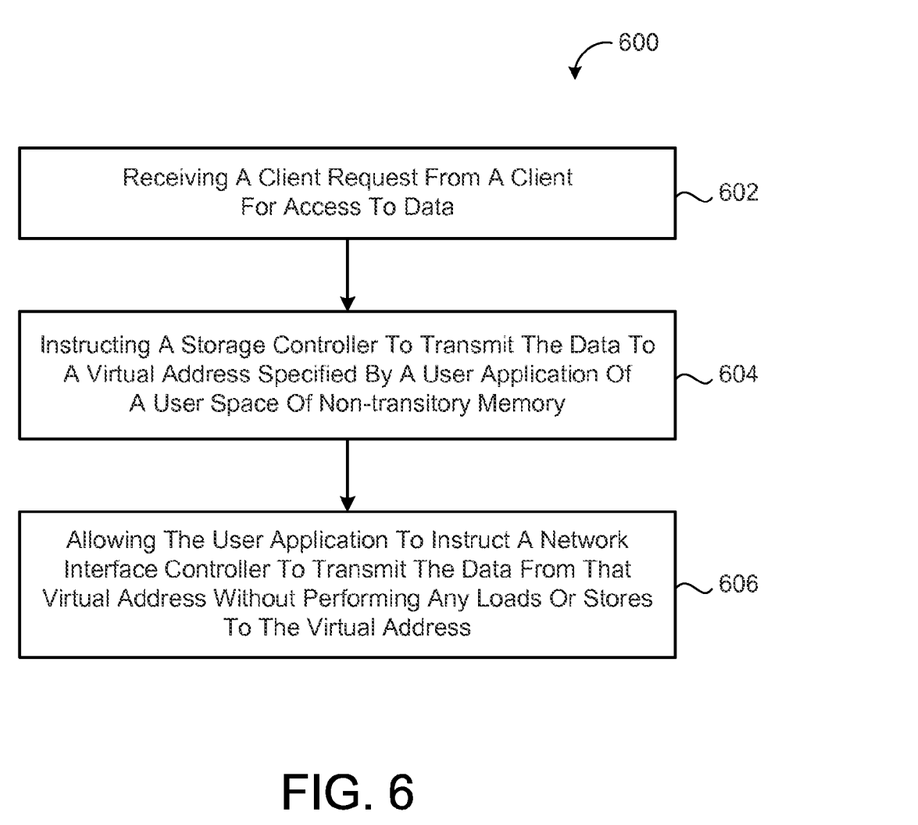

FIG. 6 provides an exemplary arrangement 600 of operations for a method of processing client requests 122. The method includes receiving 602 a client request 122 from a client 120 for access to data 10 and instructing 604 a storage controller 115 to transmit the data 10 to a virtual address 174 specified by a user application 172 of a user space 170 of non-transitory memory 114. The method may include allowing 606 the user application 172 to instruct a network interface controller 116 to transmit the data 10 from that virtual address 174 without performing any loads or stores to the virtual address 174. The storage controller 115 and the network interface controller 116 translate the same virtual address 174 to the same physical address 182 of the non-transitory memory 114. In some implementations, the storage controller 115 segregates virtual memory 150 into a kernel space 160 that stores a kernel 162 and the user space 170 that stores the user application 172. The method may include registering a set of direct memory accessible regions 180 of the memory 114 with the storage controller 115 and the network interface controller 116, such that the memory regions are available for direct memory access by both the storage controller 115 and the network interface controller 116, for example, via pinning, so that the virtual memory is not swapped out while DMA operations are in progress. The physical address 182 that receives the data 10 may be direct memory access accessible. In some examples, the method includes storing an integrity hash value or checksum with the data 10.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, non-transitory memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a non-transitory memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks;

and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method of processing client requests, the method comprising:
    receiving a client request from a client for access to data stored in non-transitory storage resources, the client request received at a network interface controller in communication with the client and the storage resources; and
    in response to receiving the client request for access to the data:
        issuing a direct memory access command to a storage controller of the storage resources to load the data to a target memory location within a direct memory accessible memory region of the storage resources without accessing the target memory location, the target memory location being available for direct memory access by the network interface controller to access the data; and
        instructing the network interface controller to send a response to the client, the response having an information portion and a data portion including the data accessed by the network interface controller from the target memory location.

2. The method of claim 1, further comprising sending a vector of at least two data buffers to the network interface controller, one of the data buffers comprising the target memory location.

3. The method of claim 1, further comprising registering a set of direct memory accessible regions of the memory with the storage controller and the network interface controller, the registered memory regions pinned from swap operations, the target memory location being direct memory access accessible.

4. The method of claim 1, further comprising storing an integrity hash value in the data portion or the information portion of the response.

5. The method of claim 4, further comprising computing a hash of the data and at least a portion of the information portion as the integrity hash value.

6. A computer comprising:
    non-transitory memory having a storage controller and including a direct memory accessible memory region;
    a network interface controller in communication with the memory and servicing client requests; and
    a computing processor in communication with the memory and the network interface controller, the computing processor executing a server process;
    wherein in response to receiving a client request from a client for access to data stored in the non-transitory memory, the server process:
        instructing the storage controller to load the data to a target memory location within the direct memory accessible memory region without accessing the target memory location, the target memory location being available for direct memory access by the network interface controller to access the data; and instructing the network interface controller to send a response to the client, the response having an information portion and a data portion including the data accessed by the network interface controller from the target memory location.

7. The computer of claim 6, wherein the server process sends a vector of at least two data buffers to the network interface controller, one of the data buffers comprising the target memory location.

8. The computer of claim 6, wherein the server process registers a set of direct memory accessible regions of the memory with the storage controller and the network interface controller, the target memory location being direct memory access accessible.

9. The computer of claim 6, wherein the data portion or the information portion of the response includes an integrity hash value for client verification of the data.

10. The computer of claim 9, wherein the network interface controller computes a hash of the data and at least a portion of the information portion as the integrity hash value.

11. A method of processing client requests, the method comprising:

receiving a client request from a client for access to data stored in non-transitory memory, the client request received at a network interface controller in communication with the client and the non-transitory memory; and in response to receiving the client request for access to the data, instructing a storage controller to transmit the data to a virtual address specified by a user application of a user space of the non-transitory memory, the user application instructing the network interface controller to transmit the data from that virtual address to a physical address within a direct memory accessible memory region of the non-transitory memory without performing any operations on the virtual address, the storage controller and the network interface controller translating the same virtual address to the same physical address of the non-transitory memory, the physical address being available for direct memory access by the network interface controller to access the data and send a response having an information portion and a data portion to the client, the data portion of the response including the data accessed by the network interface controller from the physical address.

12. The method of claim 11, wherein the storage controller segregates virtual memory into a kernel space that stores a kernel and the user space that stores the user application, the virtual address residing in the user space.

13. The method of claim 11, further comprising registering a set of direct memory accessible regions of the memory with the storage controller and the network interface controller, the physical address being direct memory access accessible.

14. The method of claim 11, further comprising storing an integrity hash value in the data portion or the information portion of the response.

15. The method of claim 14, further comprising computing a hash of the data and at least a portion of the information portion as the integrity hash value.

16. A computer comprising:

non-transitory memory including a direct memory accessible region and virtual memory, the non-transitory memory having a storage controller that segregates the virtual memory into a kernel space that stores a kernel and a user space that stores a user application;

a network interface controller in communication with the memory and servicing client requests; and a computing processor in communication with the memory and the network interface controller, the computing processor executing a server process;

wherein in response to receiving a client request from a client for access to data stored within the non-transitory memory, the server process instructing the storage controller to transmit the data to a virtual address in the user space specified by the user application, the user application instructing the network interface controller to transmit the data from that virtual address to a physical address within a direct memory accessible memory region without performing any loads or stores to the virtual address, the physical address being available for direct memory access by the network interface controller to access the data and transmit the data to the client; and wherein the storage controller and the network interface controller can translate the same virtual address to the same physical address.

17. The computer of claim 16, wherein the storage controller receives a virtual address and translates that address to a physical address.

18. The computer of claim 16, wherein the server process registers a set of direct memory accessible regions of the memory with the storage controller and the network interface controller, the target memory location being direct memory access accessible.

19. The computer of claim 16, wherein the network interface controller sends a vector of at least two data buffers to the network interface controller, one of the data buffers comprising the virtual address.

20. The computer of claim 16, wherein the network interface controller send a response to the client, the response having an information portion and a data portion.

21. The computer of claim 20, wherein the data portion or the information portion of the response includes an integrity hash value for client verification of the data.

22. The computer of claim 21, wherein the network interface controller computes a hash of the data and at least a portion of the information portion as the integrity hash value.

* * * * *